(12) United States Patent
Fix

(10) Patent No.: US 11,426,263 B2
(45) Date of Patent: Aug. 30, 2022

(54) HOLDING DEVICE FOR AN ABUTMENT BLANK, SYSTEM COMPRISING THE RETAINER AND THE ABUTMENT BLANK, AND METHOD FOR RETAINING AND MACHINING THE ABUTMENT BLANK

(71) Applicant: Medentika GmbH, Hügelsheim (DE)

(72) Inventor: Frank Fix, Remchingen (DE)

(73) Assignee: Medentika GmbH, Hügelsheim (DE)

( * ) Notice: Subject to any disclaimer, the term of this patent is extended or adjusted under 35 U.S.C. 154(b) by 841 days.

(21) Appl. No.: 14/911,217

(22) PCT Filed: Aug. 11, 2014

(86) PCT No.: PCT/EP2014/067176
§ 371 (c)(1),
(2) Date: Feb. 9, 2016

(87) PCT Pub. No.: WO2015/022296
PCT Pub. Date: Feb. 19, 2015

(65) Prior Publication Data
US 2016/0193020 A1 Jul. 7, 2016

(30) Foreign Application Priority Data

Aug. 14, 2013 (EP) ..................................... 13180431
Dec. 20, 2013 (EP) ..................................... 13198878

(51) Int. Cl.
*A61C 13/00* (2006.01)
*A61C 8/00* (2006.01)
*B23Q 3/06* (2006.01)

(52) U.S. Cl.
CPC .......... *A61C 13/0022* (2013.01); *A61C 8/005* (2013.01); *B23Q 3/062* (2013.01)

(58) Field of Classification Search
None
See application file for complete search history.

(56) References Cited

U.S. PATENT DOCUMENTS 6,527,550 B1 * 3/2003 Hajjar ................ A61C 13/0009
409/124
2004/0072121 A1 * 4/2004 Filser ................ A61C 13/0003
433/25

(Continued)

FOREIGN PATENT DOCUMENTS

| EP | 02343025 A2 | 7/2011 |
| EP | 02754408 A2 | 7/2014 |
| WO | WO-2013135687 A1 | 9/2013 |

OTHER PUBLICATIONS

Borehole definition as provided by https://www.merriam-webster.com/dictionary/borehole on Feb. 16, 2019 (Year: 2019).*

(Continued)

*Primary Examiner* — Alison L Hindenlang
*Assistant Examiner* — Virak Nguon
(74) *Attorney, Agent, or Firm* — Foley & Lardner LLP

(57) ABSTRACT

The invention relates to a holding system having a holding device (1) and an abutment blank (6), to a method for retaining and machining an abutment blank (6), and to a holding device (1) for retaining an abutment blank (6) having an implant interface (8) and a retainer segment (7) spaced apart from the implant interface (8), comprising a recess (3) in a basic body (2) for forming a frame having interior contact surfaces. One of the contact surfaces is spaced apart from the opposite contact surface such that a processing space (30) is formed, into which the abutment blank (6) to be machined extends. One of the contact surfaces has at least one retaining receptacle (5), which preferably is a tapped blind hole, and which corresponds to the retainer segment (7), preferably in a friction-locking manner, such that the retainer segment (7) of the abutment (Continued)

blank (6) is retained in the retaining receptacle (5) in a rotationally secure manner and is oriented in a predetermined position.

30 Claims, 4 Drawing Sheets

(56) References Cited

U.S. PATENT DOCUMENTS

| | | | | |
|---|---|---|---|---|
| 2005/0127695 A1* | 6/2005 | Cranston | ................... | B66C 1/34 294/82.3 |
| 2006/0105290 A1* | 5/2006 | Eiff | ........................ | A61C 13/12 433/49 |
| 2008/0070186 A1* | 3/2008 | Steger | ................ | A61C 13/0009 433/75 |
| 2009/0290949 A1* | 11/2009 | Steger | ................ | A61C 13/0009 409/219 |
| 2013/0157222 A1* | 6/2013 | Yeom | ................... | B23Q 1/5406 433/172 |

OTHER PUBLICATIONS

International Search Report and Written Opinion of related International Application No. PCT/EP2014/067176 dated Feb. 16, 2016, 15 pages.

\* cited by examiner

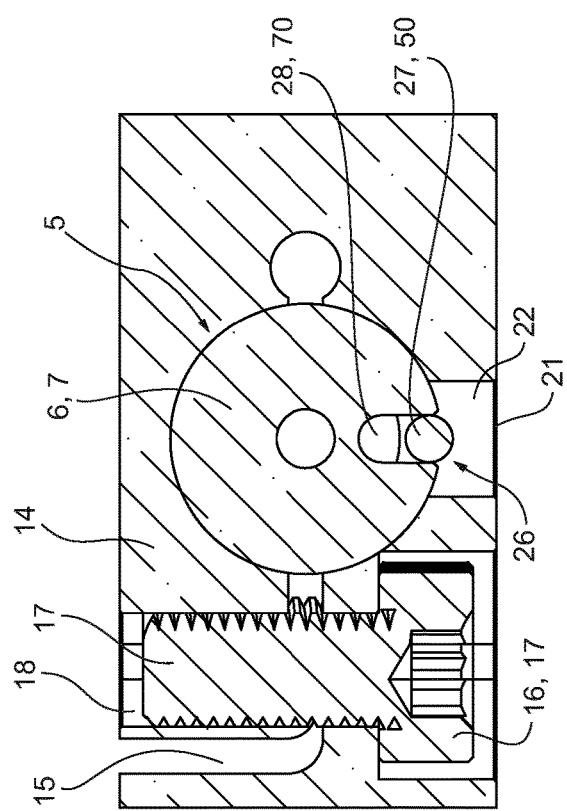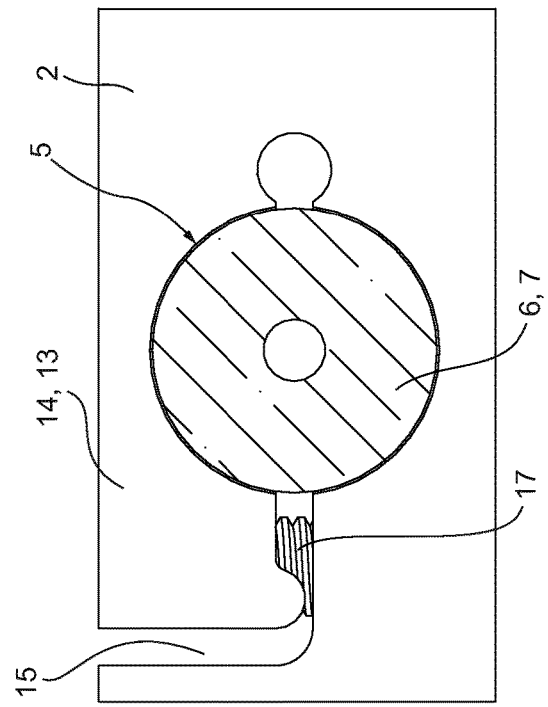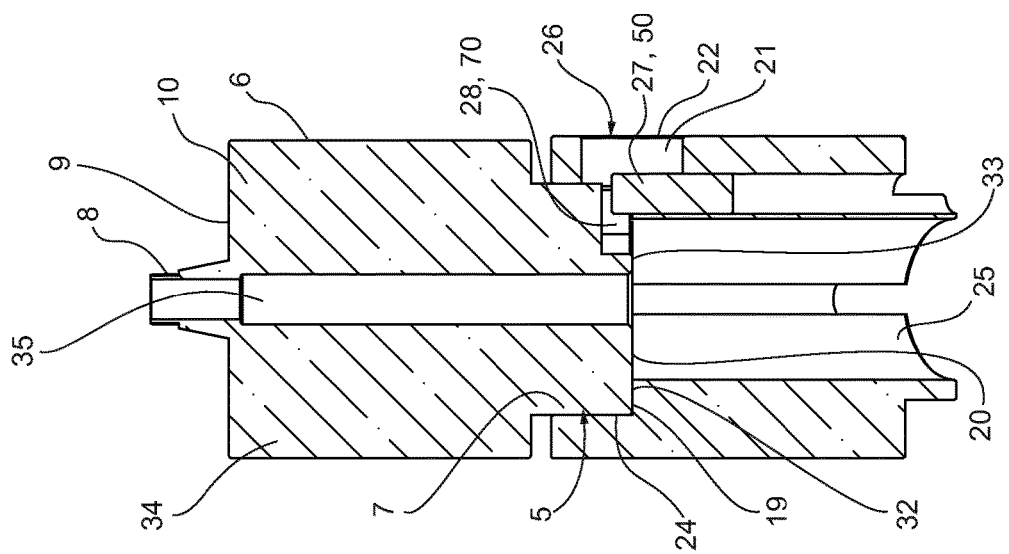
Fig. 6a
Fig. 6b
Fig. 5

HOLDING DEVICE FOR AN ABUTMENT BLANK, SYSTEM COMPRISING THE RETAINER AND THE ABUTMENT BLANK, AND METHOD FOR RETAINING AND MACHINING THE ABUTMENT BLANK

CROSS-REFERENCE TO RELATED APPLICATIONS

This application is filed under 35 U.S.C. 371, filed from PCT/EP2014/067176 having a filing date of Aug. 11, 2014, which claims priority from EP20130180431 having a filing date of Aug. 14, 2013 and EP20130198878 having a filing date of Dec. 20, 2013, all of which are hereby incorporated by reference in their entirety for all purposes.

The present invention relates to a holding device for a dental abutment blank for holding the blank, an abutment blank, a system comprising an abutment blank and a holding device for holding the blank as well as a method for retaining and machining an abutment blank by means of a holding device.

Implants can be used with artificial dentures, wherein the implant is inserted into the patient's jawbone. An abutment which offers a post-type structure is placed on this implant. In the case of a crown, this corresponds to the stump of a tooth. The artificial denture is placed on the abutment. The artificial tooth is modeled individually, so that it replaces the original tooth with as much fidelity to the original as possible and it fits on the existing natural teeth as unremarkably as possible. For optimal seating and optimal shaping of the artificial tooth, the abutment must also be adjusted individually. It may be advantageous here to tilt the abutment slightly or to twist it, depending on the existing oral anatomy (anatomy of the mouth) and the patient's existing natural teeth, or to hold it in a certain position, depending on the intended use. A certain shaping is also desirable in some cases.

To implement a desired position, the abutment is inserted into the implant in a rotationally fixed position. The implant interface, which is part of the abutment, provides the connection between the implant and the abutment. It establishes a form-fitting connection to the implant. In order to affix the abutment to the implant, it is customary to screw a screw into the implant through a concentric borehole through the implant interface of the abutment. The abutment is permanently affixed to the implant in this way.

For a high-quality denture, the abutment is prepared individually, so it is manufactured by the dental laboratory in each individual case. Abutment blanks, which already provide the implant interface, also known as the implant connection, are available for this purpose. This dental abutment blank is machined individually by the dental technician. However, the precision and accuracy to be achieved here are lower than what would be possible in industrial manufacturing. However, the interaction of implant and abutment is extremely important for the enduring stability of the artificial tooth, so the implant interface is prefabricated industrially. The highest precision can therefore be maintained, so that extremely accurate seating of the abutment in the implant is ensured. The implant interface usually has an indexing outer contour and is usually specific for each manufacturer. It allows the abutment to be inserted into the implant in predetermined rotational positions.

Then the abutment blank can be machined in the dental laboratory to produce the individual abutment. An emergence profile having a shoulder, which is adjacent to the implant interface, is usually modeled. The individual abutment is adjoined to this in the direction of the end facing away from the implant interface. It offers the supporting surface for the artificial tooth and corresponds essentially to the stump of a tooth.

For machining the abutment blanks, there are known devices in which the implant is simulated for retaining the blanks. Consequently, the retainer has a receptacle, which corresponds to the implant and into which the abutment blank with its implant interface can be inserted and retained. As a rule, the abutment blank is mounted on a so-called laboratory implant, which is in turn secured in the receptacle of the retainer. The blank and the laboratory implant are screwed together. This allows machining of the implant blank. Since the implant interface has an outer contour, which is usually an exterior hexagon head, the position of the blank in the retainer is crucial for the machining, in particular in the case of individually fabricated abutments. The machining may in general also take place in an automated process using machine tools or milling machines. Since the abutment blank is retained on the implant interface, the body of the blank can be machined in a position, in which it is freely accessible. This makes it possible to create an abutment tailored to the individual patient.

EP 2754408 also discloses a retainer for receiving abutment blanks, which ensures a fixedly predefined positioning of the blank. However, automated machining of the blank in one operation cannot be implemented with this retainer because the blank is not freely accessible.

It is thus an object of the present invention to create a retainer for a (dental) abutment blank, with which simple and inexpensive machining is possible, and satisfactory long-term functioning of the abutment can be ensured.

The present object is achieved with a holding device for retaining a dental abutment blank according to claim 1, having a system comprising a dental abutment blank and a holding device for retaining the blank according to claim 2 as well as with a method for retaining and machining an abutment blank according to claim 11.

Within the context of the invention, it has been found that in machining of the dental abutment blank, vibrations that exert forces on the implant connection (also referred to as the implant interface) occur when the blank is held on the implant connection. In this manner a high stress on the implant connection of the implant blank may occur with intense and extensive machining in the individual case and may even result in damage in the extreme case. It has been recognized that the implant connection of the abutment blank plays a crucial role in a satisfactory functioning of the abutment in the implant and therefore must not be damaged and must not be subjected to any forces in the machining of the abutment blank and in the production of the abutment.

The invention is also based on the finding that for the machining, the abutment blank can also be retained on a region (retainer section) spaced apart from the implant interface, preferably on a region of the body of the abutment blank positioned distally from the implant interface. Whereas the industrially prefabricated implant connection is located on the first end of the body of the blank, a retainer section is preferably present on the body of the blank at another location on the body of the blank spaced apart from the implant interface. The retainer section is preferably situated on the second end of the abutment blank, preferably opposite the implant interface.

The implant interface usually has a defined outer contour for defined seating in the implant. The outer contour may, for example, be in the shape of an outer hexagon or a polygon or any other shape that allows a defined orientation of the abutment. The defined orientation of the abutment and/or the construction part of the abutment with respect to the interface and/or the outer contour of the implant interface must be taken into account already in the production of the abutment from the blank. It has been recognized that a very precise and defined alignment is necessary for high-quality abutments, and the alignment has a great influence on the quality of the fit of the abutment and of the artificial tooth in the mouth. A faulty alignment or excessive tolerances cause incorrect seating in the mouth, so that the artificial tooth creates pressure on the neighboring teeth. Inaccurate seating facilitates the infiltration of bacteria between the tooth and the implant, which can cause inflammation and complaints in the patient.

According to the invention, the holding device has a basic body with a retaining receptacle, which retains or accommodates the abutment blank. The retaining receptacle and the abutment blank and/or its retainer section correspond to one another preferably in such a way as to result in a form-fitting connection. The abutment blank is held in the retaining receptacle with its retainer section. The holding device has an anti-twist protection, which prevents the abutment blank from twisting, in particular about its longitudinal axis. Therefore, both the retaining receptacle and the retainer section of the blank have coupling means, which correspond to one another and cooperate with one another. The retaining receptacle comprises a positioning element as a first coupling means. The abutment blank has an aligning element as the second coupling means, which is preferably located on the retainer section of the blank. The retaining is accomplished by the fact that the abutment blank is held in a rotationally secure manner in a predefined position to allow machining of the blank preferably by machine in an automated process. Retaining the blank in a predefined position is advantageous and in some cases is also necessary to be able to manufacture the so-called post construction of the abutment in relation to the outer contour of the implant interface.

In retaining the abutment blank, the implant interface of the abutment blank is spaced apart from the holding device, preferably from the retaining receptacle. The abutment blank is therefore held in the retaining receptacle in such a manner that the implant connection, i.e., the implant interface, does not have a direct link or any contact with the holding device. The interface, which is spaced apart from the basic body in particular, is preferably freely accessible.

Optionally, the abutment blank is clamped at one end on its retainer section in the retaining receptacle, preferably on its end opposite the implant interface, so that the implant interface is spaced apart from the holding device.

If the blank is retained in the retaining receptacle, then a machining region of the abutment blank adjoining the implant interface is freely accessible for machining of the blank. This machining segment of the blank is the region of the body of the blank that is machined and forms the emergence profile and the abutment (post construction) with the contact surfaces for the artificial tooth in the completely machined abutment.

Within the context of the present invention, the term "freely accessible" is understood to mean that the abutment blank can be machined fully, preferably from all three directions in space. The final outer shape of the abutment can thus be created while the abutment blank is clamped in the retaining receptacle. The abutment can preferably be manufactured automatically in one operation. After removing the abutment blank from the retaining receptacle, the retainer section of the abutment blank is optionally detached. However, it is also conceivable to carry out this machining step while the abutment blank is clamped in the retaining receptacle.

The basic body of the holding device preferably has a plurality of retaining receptacles to retain a plurality of abutment blanks simultaneously, so that they can be machined in one operation, for example. Automated machining of a plurality of blanks in parallel or in succession is possible in this manner without having to remove one blank from the holding device before another can be machined. Individual machining steps can also be carried out on a plurality of blanks before a further machining step is carried out. The retaining receptacles can be positioned side by side or on different sides, preferably on opposite sides of the basic body. They may comprise a recess, for example, a blind hole or a through-hole.

In a preferred embodiment of the holding device, the basic body has a cutout or a recess, which forms a machining area, into which the abutment blanks that are retained extend at least partially. The recess may be a cavity or a hollow space or something similar. The recess is preferably accessible from at least two sides.

The processing space being formed is preferably surrounded at least partially by parts of the basic body. For example, the cutout may be a passage in the holding device. The basic body of the holding device forms an enclosure or a frame with interior (contacting) surfaces or inner surfaces. The frame encloses the recess. The result is a processing space between the interior surfaces, which is accessible and open from two sides. A retaining receptacle is preferably located on at least one of the interior surfaces, so that the abutment blank to be machined extends into the processing space when it is held in the retaining receptacle. A plurality of retaining receptacles may also be located on an interior surface. They preferably form a blind hold or a through-hole and correspond to the retainer section of the abutment blank in such a manner, preferably form-fitting, that the retainer section of the abutment blank is retained in the retaining receptacle in a predetermined position in a rotationally secure manner to enable defined positioning of the blank.

In a preferred embodiment, the body of the abutment blank is cylindrical. A retaining system consisting of the holding device and the abutment blank has an anti-twist protection formed by the positioning element of the retaining device and the aligning element of the abutment blank. The aligning element is preferably a groove, which is preferably accessible from the free end of the retainer section. The positioning element is also preferably a web or a post or a similar part or a modeled shape on the retaining receptacle of the holding device. An anti-twist protection with a very low tolerance and a high precision can be created in particular through the use of a groove and post and/or a groove and web. The positioning element may of course also be a groove and the aligning element may be a web or a post or something similar. Other coupling means corresponding to one another are also conceivable. A rotation-indexed alignment of the blank can thus be ensured.

It is preferably also possible for the anti-twist protection and/or the coupling means, i.e., the positioning and aligning elements, to be formed by the geometry or the contour of the retaining receptacle and of the retainer section.

The cross-sectional shape of the retaining receptacle need only correspond to the cross-sectional shape of the retainer section of the abutment blank. For example, the retainer section of the abutment blank need not be rotationally symmetrical. It may have an oval or angular cross section. The cross section may be rectangular, square, triangular or round. Any other defined shape that can be described mathematically as a polygon, for example, can of course also form the cross section. It is important only that the retaining receptacle and the retainer section have corresponding cross sections, so that a form-fitting connection can preferably be achieved. In this manner, an anti-twist protection can also be implemented, so that the blank is retained in a rotationally secure manner and in a predetermined orientation in the holding device.

The holding connection can be accomplished, for example, by the fact that the two coupling means can be coupled to one another in such a manner that a form-fitting and/or friction-locking but releasable connection is formed. For example, the coupling means may each have a thread corresponding to the other, i.e., so that they intermesh.

In a preferred embodiment, the retaining receptacle of the retaining device is a borehole, particularly preferably a blind hole having a bottom. The body of the abutment blank is held in this blind hole at its end, preferably its distal end, which is especially preferably opposite the implant interface. For this purpose, the retainer section of the body of the blank is preferably fitted into the retaining receptacle of the holding device. A releasable connection between the abutment blank and the holding device is preferably established by a form-fitting connection and/or alternatively by a friction-locking (force-fitting) connection.

The holding device preferably has a fixation element on the retaining receptacle. Such a fixation element may be clamping jaws, for example, or the like, so that the abutment blank is retained in the retaining receptacle by being clamped. The clamping jaws may be connected to the holding device in one piece, for example. It is also possible to implement clamping jaws that are available as a separate component. This is preferably connected to the retaining receptacle by clamping means so that a press fit is achieved. For example, the clamping jaws can be screw-connected to the retaining receptacle. Alternatively or additionally, a magnetic restraining unit, for example an electromagnet, may be integrated into the holding device to preferably support the restraining of the blank.

In a preferred embodiment, the abutment blanks to be machined are cylindrical and thus have a round cross section. The restraining receptacle of the holding device is also round in this case. Twist-preventing means must be provided because the round cross-sectional shape does not offer any protection against rotation or twisting. For example, such twist-preventing means may be provided by a combination of a recess and a widened area (bulge) or preferably by a groove and post, as described above. If the restraining segment is cylindrical and the holding device is designed to correspond to it, then the restraining segment can be clamped by the fixation element around the full circumference, preferably by the clamping element. The abutment blank is then clamped in the retaining receptacle in a particularly secure manner, so that vibration of the abutment blank during machining is minimized. This makes it possible to machine the abutment blank with a high precision. For example, the manufacturing tolerances in machining of the abutment blank are in the range of ±0.01 mm.

However, it is also conceivable to clamp the abutment blank having a clear-cut outer contour around the full circumference with the help of clamping elements and/or clamping jaws. If the outer contour of the abutment blank is in the form of an external hexagon, a polygon or any other shape that allows a defined alignment of the abutment, then the retaining receptacle is designed to have a shape corresponding to the outer contour of the abutment blank. Tightening of the clamping jaws then results in a form-fitting connection between the non-rotationally symmetrical shape of the retainer section and the clamping jaws. The retainer section is clamped on the full circumference with the help of the clamping jaws.

To ensure accurate seating of the abutment blank in the holding device, checking means or an observation port, which signals accurate seating of the abutment blank in the retaining receptacle of the retainer or makes its seating observable may be provided in the holding device. These means are preferably of a visual type. An inspection window or an inspection borehole is especially preferably used to permit a visual inspection. In the simplest case, the holding device has a borehole, through which the retainer section of the abutment blank can be at least partially observed with accurate positioning in the restraining receptacle of the holding device. If the restraining receptacle includes a blind borehole with a bottom, the holding device preferably has an observation borehole, which makes it possible to observe the bottom. The borehole for observation is preferably located on the side of the holding device. The borehole is especially preferably essentially perpendicular to the longitudinal axis of the retaining receptacle or of the abutment blank. It is thus possible to observe, for example, whether the blank is in contact with the bottom of the restraining receptacle.

Visual inspection of whether the blank is accurately seated in the restraining receptacle can be performed, for example, using a visual measurement and evaluation unit, which may include a camera or photodiodes or the like. This is advantageous in automated production of the abutment.

The abutment blank according to the invention has an implant interface, a machining section adjoining the implant interface and a retainer section spaced apart from the implant interface and having an alignment element. The alignment element corresponds to the positioning element of a retaining receptacle of a holding device. Due to their cooperation, the abutment blank is held in a rotationally secure manner in the retaining receptacle.

In a preferred embodiment, abutment blanks, the body of which has an implant interface, are used, wherein the implant interface corresponds especially preferably to a longitudinal axis of the abutment blank. In a particularly preferred embodiment, the dental abutment blank has a borehole extending concentrically through the implant interface. Subsequently, after production of the abutment, the retaining screw, which is screwed into the implant and holds the abutment in the implant, is passed through this borehole.

In a preferred embodiment of the abutment blank, the body of the blank is larger in its longitudinal extent than the abutment to be produced.

The machining section of the blank is preferably cylindrical and has a retainer section on a distal second end opposite the first end on which the implant connection is located. The retainer section, preferably also cylindrical, adjoins the machining section. The retainer section need not be used for machining and need not be available for construction on the abutment. It has a retaining function only.

The outer contours of the retainer section and of the machining section are preferably the same. The same is also preferably true of the circumferences. The retainer section and the machining section preferably merge seamlessly into each other, in particular in the case of a cylindrical abutment blank. The retainer section and machining section may also differ from one another in shape, contour and circumferential size. The retainer section is preferably standardized and only the machining section is different. The machining section can thus already be adapted to the subsequent shape of the abutment and the post construction.

In a preferred embodiment, the abutment blanks (milling blanks) are made of metal. The blank is especially preferably made of titanium, stainless steel or cobalt chrome (CoCr). However, other materials are also possible, for example, ceramics, plastics or the like.

Since the abutment blank is held only on the retainer section, which is spaced apart from the implant interface, preferably being opposite it, no forces are exerted on the interface (implant connection) during the machining of the blank. This implant connection can be prefabricated industrially with a uniformly high precision (extremely high precision) and with minimal tolerances (in the micrometer range). Since the high precision of the implant connection is of crucial importance for a satisfactory and long-term functioning of the abutment in the implant in the patient's mouth, it is important that no forces be applied to the interface. This is ensured by the holding device according to the invention.

In a preferred embodiment, the holding device has a plurality of retaining receptacles, so that a plurality of abutment blanks can be held at the same time. This permits automated machining, which is also faster.

The holding device for the abutment blanks is preferably designed in such a manner that it can be inserted into a standard receptacle on a machine tool, for example, a milling machine. In this way, abutments can be machined using traditional milling machines. The machining is done by milling, turning, chipping or similar machining steps, for example, preferably in a fully or partially automated operation.

In a preferred embodiment, the holding device is made of stainless steel. It is especially preferably made of solid stainless steel. Other materials may of course also be used, but the holding device is preferably made of a metal, for example, titanium. Other materials, including plastics, are conceivable.

The holding device is preferably in one piece. Any potential clamping function for clamping or chucking the abutment blank in the holding device can be implemented by eroded slots in a tension region of the holding device. The clamping jaws produced by eroded slots can be bolted to the base shape (basic body) of the holding device by means of bolts, for example, so that a tension is exerted on the retainer section of the abutment blank. A friction-locking connection can be created in this way.

For individual production of an abutment from a dental abutment blank (abutment blank), a plurality of steps is carried out according to the invention. First, a holding device having a retaining receptacle is used. The retaining receptacle and retainer section of the abutment blank correspond to one another. In a first step, the retaining receptacle is preferably prepared, optionally in such a manner that it is ready to receive the abutment blank. If clamping jaws or similar clamping devices are provided to hold the abutment blank in a friction-locking manner, these clamping devices are preferably released or loosened. In a next step, the abutment blank with its retainer section is preferably introduced into the retaining receptacle. In doing so, a definite rotational and/or rotation-indexed alignment of the abutment blank in the retainer is created and secured. The blank is held in a desired position in a rotationally secure manner. This can be achieved, for example, by the fact that a non-rotationally symmetrical shape of the retainer section and the retaining receptacle correspond to one another accordingly or a twist-proof connection is provided in the form of a post and groove, for example, or a web and groove.

In an optional additional step of the method, a visual inspection is preferably performed to ascertain whether the abutment blank has reached its axial end position in the retaining receptacle. This can be accomplished, for example, by an inspection borehole or an inspection window. The visual inspection can be conducted manually or in an automated process, for example, by means of a camera, a photodiode, a light barrier (either visible or invisible, e.g., infrared) or by means of electric contacts.

In an optional additional step, the abutment blank is preferably secured in the retaining receptacle. For example, this may take place by tightening or closing clamping jaws, clamping segments or chucking jaws, so that the form-fitting connection is completed or supplemented or replaced by a friction-locking connection. The blank is retained accurately and reliably in the retaining receptacle, and its position can be fixed by means of this clamping.

In another step, the holding device is preferably clamped in a corresponding receptacle on a milling machine and secured there.

In the next step, the abutment blank is machined, preferably first creating an emergence profile with a shoulder, starting preferably at the proximal end of the body of the blank and close to the implant interface. A construction or a post-type abutment region adjoins this emergence profile. The abutment is preferably milled completely.

In a preferred embodiment of the method, the abutment (and/or the post construction) and the retainer section remain connected to one another in at least one location and are removed jointly from the holding device. In another step, they are separated from one another by manual processing. Further machining of the abutment may take place, for example, by manual post-processing.

Alternatively, in another step of the method, the abutment is preferably released, i.e., separated, by a cut or by deep milling from the retainer section of the abutment blank on the proximal end of the abutment to be prepared. In this machining step, the abutment is separated from the retainer section, so that it preferably falls out of the holding device. It is preferably captured or picked up by a capture device, for example, by a collecting tray. The capture device may preferably also consist of a wire or a thin cable stretched between the holding device and the implant interface.

In the next machining step, the holding device is preferably released from the milling machine. The retainer sections of the abutment blanks, which are possibly still being held in the holding device, are preferably removed from the retaining receptacles, so that the holding device can be used again for machining additional abutment blanks. The holding device may be cleaned before being reused.

With this method, when using a holding device having a plurality of retaining receptacles, a plurality of blanks can be machined parallelly or sequentially by repeating individual steps.

The individual method steps described above need not necessarily be carried out in the order described here. At any rate, they may be performed at least partially with automation.

As the abutment blank is held in the holding device at the distal retainer section and clamping occurs only there, so that forces occur only on the retainer section, no forces are transferred to the implant interface. The retainer section itself is not used to produce the abutment. This yields the advantage that the high precision of the implant connection is retained because no forces are exerted on the implant connection. This ensures satisfactory and long-term functioning of the abutment in the implant. There is no physical stress or burden on the implant interface during the milling operation. Consequently, there cannot be any weakening of the permanent stability, durability or reliability of the abutment in the implant as a result of the production of the abutment from the abutment blank.

The positive properties and advantages of the abutment blank and of the holding device as well as the retaining system are listed again below:

The abutment blanks are preferably cylindrical and are designed with two diameters. With diameters between 9 mm and 13 mm, preferably 11.5 mm, and between 14 mm and 21 mm, preferably 16 mm, they ensure the required variability. The retainer section preferably has the smaller diameter, i.e., preferably 11.5 mm. These diameters ensure an accurate zero point definition for machining due to the preferably uniform length. At a glance, the advantages of the abutments according to the invention are as follows:

Short machining times in production—due to two blank diameters

Maximum freedom in design—due to optimized selection of milling blanks

Maximum protection for the accurately designed implant interface—due to clamping of the abutment, preferably only on the front end. The retainer section of the blank may of course also be on a side region of the abutment blank body. It need only be spaced apart from the implant interface in such a manner that no forces act on the interface.

The highest precision in the implant interface—due to prefabricated standardized manufacturing processes More freedom in design of the emergence profile—due to the special design of the blanks and due to unrestricted accessibility of the blank in machining. This is achieved by, among other things, the fact that the milling blank is not clamped on the interface but instead is clamped on the opposing retainer section.

The abutment retainers (holding devices) according to the invention offer excellent value creation. The optimum choice of blanks, the minimum number of components and the advantages of automated production lead to extremely efficient manufacturing processes. An overall system is made available, despite immense flexibility in the design of production. The advantages of the abutment retainer according to the invention at a glance are as follows:

Significantly more accurate production than with traditional retainers—due to the innovative one-piece design Short production times—due to the simultaneous machining of a plurality of blanks, preferably six blanks in one operation Particularly time-saving procedure—due to preferably clamping of the abutment with preferably only one screw in the retainer, for example, by means of a clamping device Maximum protection for the precision design of the implant interface—due to preferably clamping of the abutment, preferably only on the front end Very comprehensive production that is not subject to errors—due to a minimum number of components Extremely favorable investment—due to the simple design of the abutment retainer and avoidance of expensive disposable parts.

The accompanying drawings describe a particular embodiment of an abutment blank retainer and/or a holding device. A few particulars about this are explained herein. These may be used individually or in combination or in any other configuration. The individual features of the abutment retainer described below may be implemented in part or in a different form in other similar abutment retainers. They need not be present in the combination shown here. It is pointed out explicitly that the individual particular details may also occur separately and alone in another retainer.

One exemplary embodiment of the invention is described below with reference to the accompanying figures, in which:

FIG. 5 shows a cross section from the front side to the rear side of the holding device through the retaining receptacle, including the abutment blank;

Figure 8:
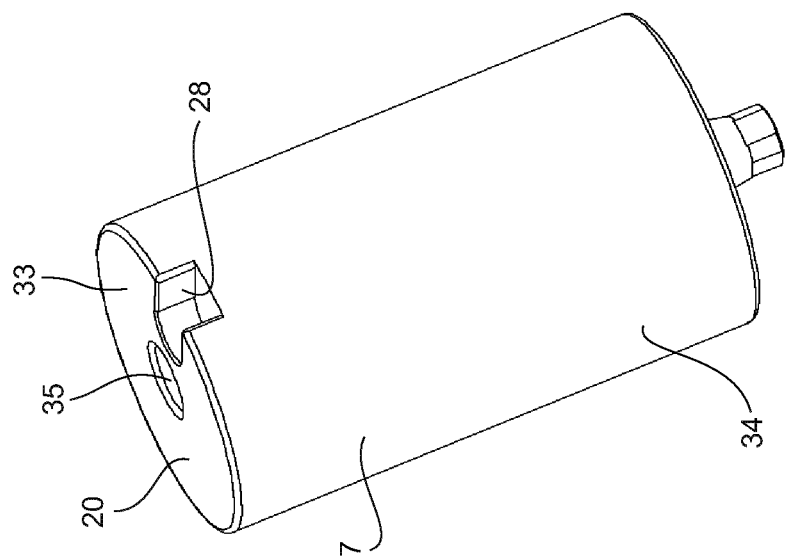
Figure 7:
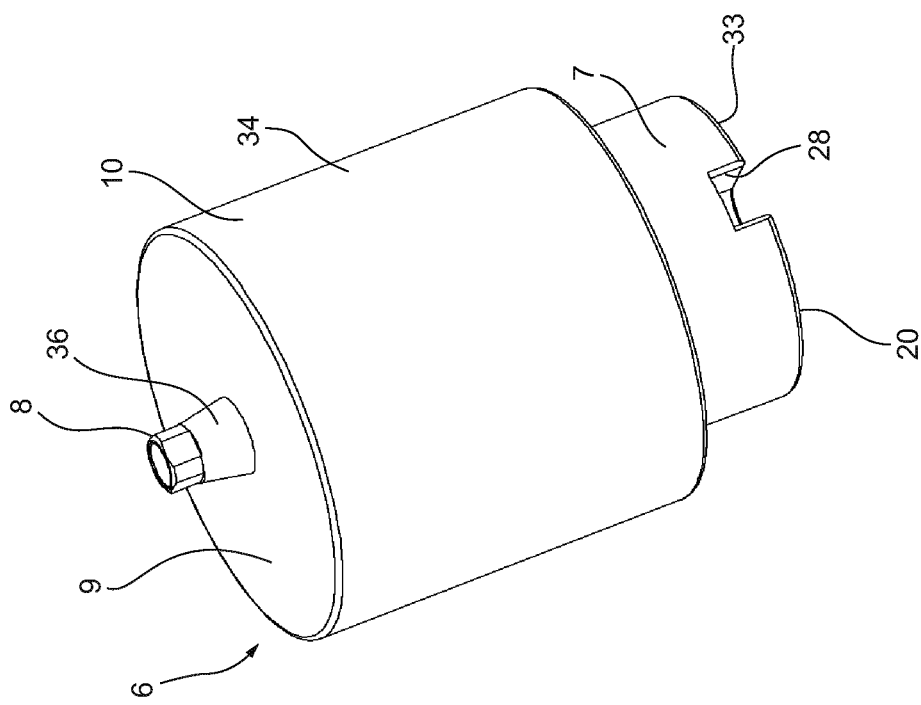

FIGS. 6a, b show a longitudinal section from the front to the rear of the holding device in two different levels;

FIG. 7 shows a first embodiment of the abutment blank in a perspective view;

FIG. 8 shows a second embodiment of the abutment blank in a perspective view.

Figure 1:
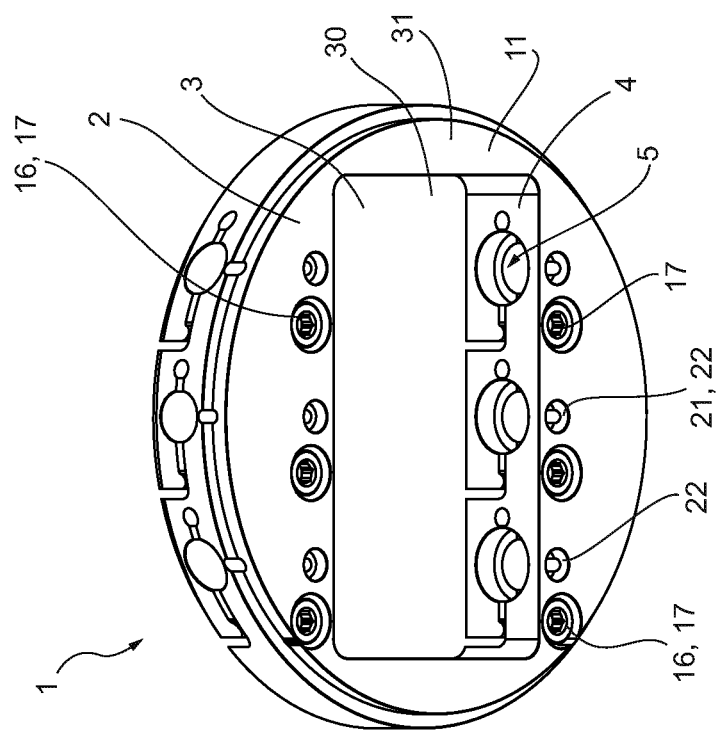
FIG. 1 shows a disk-shaped holding device from its front side.

The holding device 1 preferably has a disk-shaped form, such as that shown in FIG. 1. The external shape of the holding device 1 is round in the example shown. It therefore fits into a corresponding receptacle of a machine tool, for example, a milling machine. The external shape of the holding device 1 may of course also be different, for example, having at least two exterior sides, each being approximately rectangular or square and running preferably parallel to one another, The holding device 1 preferably has a cutout 3 in its basic body 2. The basic body 2 accordingly forms an enclosure or a frame 31 with interior contact surfaces (interior surfaces) 4 and a processing space 30. The processing space 30 thus formed is preferably accessible from two sides, so that it is possible to use a mill, preferably a dental mill, to machine an abutment blank being retained. The cutout 3 is preferably rectangular, but the corners may be rounded. This yields at least two (preferably parallel) opposing contact surfaces 4. FIG. 1 shows one possible design of this embodiment.

The holding device 1 preferably has retaining receptacles 5 in its interior surfaces 4. At least one retaining receptacle 5 is provided. In the example according to FIG. 1, three retaining receptacles 5 are positioned side by side in the first interior surface 4. The opposing interior surface 4 also has three retaining receptacles 5. Two, four, six or more retaining receptacles 5 may also be provided in at least one of the sides. The two surfaces or interior surfaces respectively, which run at an angle to the interior surfaces 4 and are preferably arranged in a rectangle, may also have retaining receptacles.

Figure 2:
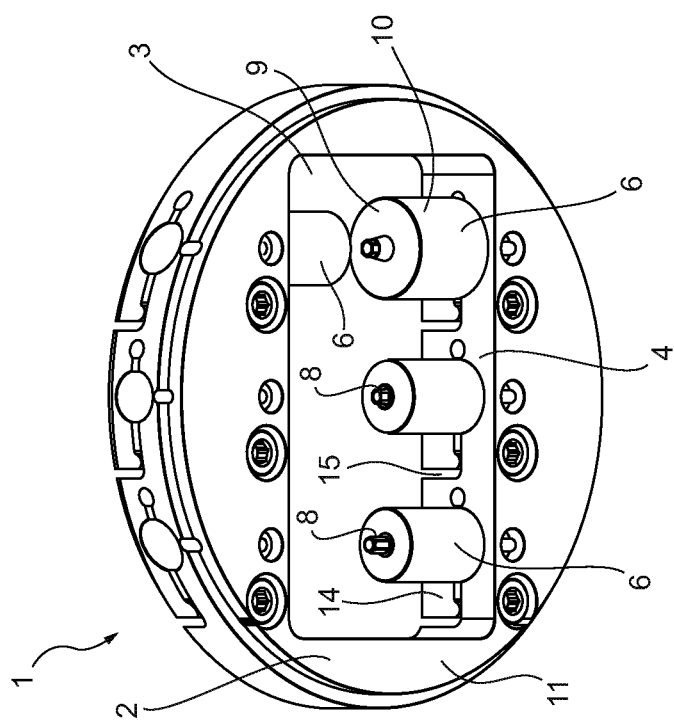
FIG. 2 shows the holding device from FIG. 1 with three abutment blanks.

FIG. 2 shows the holding device 1 from FIG. 1 with a total of four abutment blanks 6, wherein three of the abutment blanks 6 are positioned in the retaining receptacles 5 of the first interior surface 4, while another abutment blank 6 is positioned in the retaining receptacle 5 of the opposing interior surface 4.

In a preferred embodiment, the retaining receptacles 5 of the holding device are identical. This presupposes that the retainer sections of the abutment blank are also identical, i.e., that the retainer sections of the abutment blank 6 correspond to the retaining receptacles 5. In the present case, the retainer sections and the entire abutment blanks 6 are cylindrical. Consequently, the retaining receptacles 5 are also cylindrical. It is shown that one of the blanks 6 has a body with a diameter larger than the diameter of the retainer section, but the retainer section is identical to that of the other blank.

FIG. 2 shows that, on a free end 9 of a body 10 of an abutment blank 6, each of the blanks used here has an implant interface 8 which is prefabricated industrially with a high precision and has a precision designed shape with only minimal tolerances. The abutment blank 6 is positioned with its retainer section in the retaining receptacle 5 of the holding device 1 in such a manner that the implant interface 8 protrudes into the interior of the cutout 3. It is therefore freely accessible, but at the same time is not burdened by forces. The implant interface does not have any contact with the holding device 1.

Figure 3:
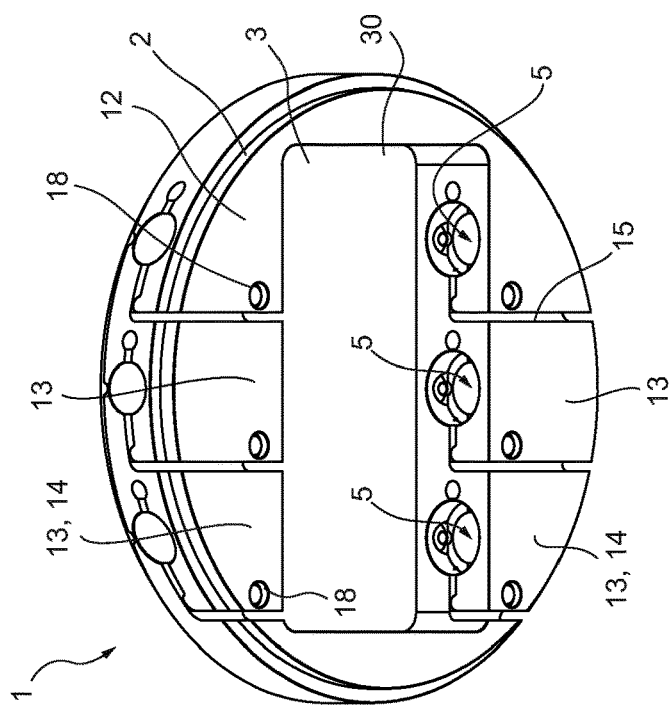
FIG. 3 shows the holding device from FIG. 1 from the rear side.

Whereas FIG. 1 shows the front side 11 of the holding device 1, FIG. 3 shows the rear side 12 of the holding device 1. Clamping devices 13, each being assigned to a retaining receptacle 5, are clearly discernible. In the form shown here, the clamping devices 13 are designed as clamping jaws 14, which are connected in one piece to the basic body 2 of the holding device 1. The clamping jaws 14 are formed by eroded slots 15. The clamping jaws 14 can be brought up to the basic body 2 by means of a tension element 16 (FIG. 6*a*), so that the abutment blank 6 is held in a friction-locking connection in the retaining receptacle 5. One possible design of the preferred embodiment is the use of hexagon head screws or other screws 17, which engage in a threaded borehole 18 of the clamping jaws 14.

Figure 4:
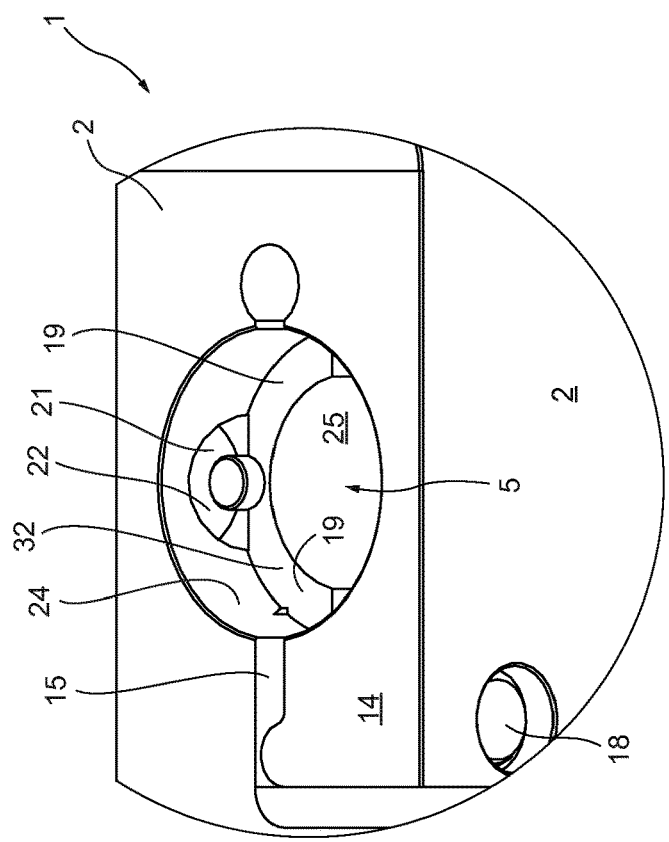
FIG. 4 shows a detailed drawing of a retaining receptacle of the holding device from FIG. 3.

FIG. 4 shows a detailed drawing of the retaining receptacle 5 as a borehole. A shoulder 19, which forms a supporting surface 32 for an end face 33 of the second end 20 of the abutment blank 6, is formed in the lower region of the retaining receptacle 5 (FIG. 5).

Boreholes 21 are provided in the front side 11 of the holding device 1 in the region of the retaining receptacle 5 in which the shoulder 19 is provided. These boreholes serve as inspection windows 22, permitting visual inspection of whether the abutment blank 6 is positioned completely in the retaining device 5, i.e., whether the end face 33 is in contact with the supporting surface 32.

FIG. 5 shows a vertical section through a subregion of the holding device 1. In this section, the abutment blank 6 as well as the basic body 2 of the holding device 1 are cut. The machining section 34 of the abutment blank 6, for example, has a larger diameter than the retainer section 7, which adjoins it and whose shape corresponds to that of the retaining receptacle 5. In the embodiment shown here, the abutment blank 6 has a through-hole 35 running concentrically with the longitudinal axis of the abutment blank and through the implant interface 8. The through-hole 35 has a shoulder near the interface 8, on which a screw head of a mounting screw can rest, so that the abutment thereby produced can later be screwed into the dental implant in the patient's mouth.

In the section according to FIG. 5, it can be seen that the retaining receptacle 5 formed by the borehole 24 has a larger diameter at the end oriented toward the interior surface than the borehole region 25 located toward the outside of the basic body 2. This forms the shoulder 19, which forms the support 32 for the abutment blank 6.

In a preferred embodiment, in particular in the case of a retaining receptacle 5 that has a rotationally symmetrical cross section, the holding device 1 has an anti-twist protection 26 or an anti-twist safeguard. The anti-twist protection 26 is preferably formed by a positioning element 50 on the retaining receptacle 5 and an aligning element 70 on the retainer section 7. The anti-twist protection 26 may be formed by a post or a web, for example, which engages in a corresponding recess or groove in the abutment blank 6. FIG. 5 shows one possible embodiment, in which a post 27, formed in the retaining receptacle 5, cooperates with a groove 28 at the end of the retainer section 7. With proper seating of the abutment blank 6 in the retaining receptacle 5, the post 27 extends into the groove 28 in the retainer section 7 and secures the positioning of the blank in the holding device 1.

The inspection window 22 is preferably designed in the form of the borehole 21. In the example shown here (FIG. 5), the inspection window is located at the height of the anti-twist protection 26. The inspection window may of course also be positioned on the opposite side or in another suitable position.

FIGS. 6*a* and 6*b* show a longitudinal section through the retaining receptacle, wherein the section is made through the tension element 16 in FIG. 6*a*. The eroded slot 15, which at any rate partially separates the clamping jaw 14 from the basic body 2, can be seen clearly. The tension element 16, embodied as a screw 17, engages in the threaded borehole 18. The clamping jaw 14 can be moved by rotating the screw 17 in the direction of the retaining receptacle 5 to clamp and/or brace an abutment blank 6 over the full circumference in the retaining receptacle 5.

FIG. 6*a* again shows the anti-twist protection 26 in the form of the post 27, which engages in the groove 28. The inspection window 22 is also shown again.

FIG. 6*b* shows a section above the tension element 16 to show the clamping jaw 14 and the slot 15 again.

FIGS. 7 and 8 show two embodiments of the abutment blank 6 from different perspectives.

With both embodiments, the implant interface 8, whose outer contour has a polygonal shape, is located on the first end 9 of the abutment blank 6. The interface 8 comprises a base 36 in the form of a truncated cone, which is adjoined by the cylindrical machining region 34 of the body 10 of the blank. The retainer section 7, which is also cylindrical, is connected to the machining region 34 and forms the end face 33 of the second end 20 of the abutment blank 6 at the lower end in FIG. 7.

The groove 28, which is preferably U-shaped and in which the post 27 engages in the retaining receptacle 5, is situated on the second end 20 of the abutment blank 6 (cf. FIG. 5). The U-shaped groove 28 is preferably open on the end face 33 and in the direction of the outer contour of the retainer section 7.

The through-hole 35, which runs through the entire body 10 of the blank, extends along the longitudinal axis of the abutment blank 6. The through-hole 35 emerges from the abutment blank 6 at the interface 8 and the end face 33.

The two embodiments shown here differ only in the diameter of the machining region 34. In the first embodiment of the abutment blank 6 in FIG. 7 the machining region 34 has a larger diameter than the retainer section 7. The machining region 34 is therefore set back with respect to the retainer section 7. In the second embodiment according to FIG. 8, the outside diameter of the machining region 34 and of the retainer section 7 are identical. The machining region 34 and the retainer section 7 jointly form a uniform cylindrical outer contour of the abutment blank 6.

The invention claimed is:

1. A holding device for holding an abutment blank, the abutment blank having an implant interface, a machining section adjoining the implant interface, a retainer section spaced apart from the implant interface and an aligning element, the holding device comprising:
- a basic body including a retaining receptacle for holding the abutment blank, the retaining receptacle including a positioning element, the retaining receptacle corresponding to the retainer section of the abutment blank, the positioning element of the retaining receptacle is positioned to cooperate with the aligning element of the abutment blank,
- the basic body further including at least one clamping jaw and a tensioning element, the at least one clamping jaw integrally formed with and extending from the basic body, wherein a slot is formed between the clamping jaw and the basic body, the tensioning element movable along an axis to tension the clamping jaw into a direction of the basic body to reduce a size of the retaining receptacle and effect a tension onto the abutment blank, the tensioning element axis is spaced apart from a central axis of the retaining receptacle to move the at least one clamping jaw into the direction of the basic body along the axis of the tensioning element thereby securing the abutment blank in the retaining receptacle, wherein the abutment blank is held force-fitting with the retainer section in the retaining receptacle to resist rotation.

2. A holding system for holding an abutment blank for machining, wherein the abutment blank has an implant interface, a machining section adjoining the implant interface and a retainer section spaced apart from the implant interface and adjoining the machining section, the holding system comprising:
- a basic body including at least one clamping mechanism and at least one tensioning mechanism to tension the clamping mechanism and at least one retaining receptacle for holding the abutment blank, the retaining receptacle having a positioning element and positioned to receive the retainer section of the abutment blank, and the positioning element cooperates with an aligning element of the abutment blank such that the abutment blank is held with the retainer section in the retaining receptacle in a rotationally secure manner and in a predetermined position, and
- an observation opening having a central axis, the central axis extending into the at least one retaining receptacle to enable viewing inside the retaining receptacle when the abutment blank is disposed within the retaining receptacle, the observation opening sized to enable viewing of the positioning element when the retaining receptacle is empty, and to enable viewing of the positioning element and the aligning element when the abutment blank is seated in the retaining receptacle, wherein the observation opening allows for observing the positioning element during inserting the abutment blank into the retaining receptacle and wherein the observation opening is independent of the at least one tensioning mechanism to hold the abutment blank in the retainer section.

3. The holding system according to claim 2, further comprising a pair of clamping mechanisms forming at least a part of a side wall of the retaining receptacle and whose position is changed, such that a friction-locking connection is created.

4. The holding device or the holding system according to claim 1 or 2, wherein the retaining receptacle includes a recess configured to receive at least a portion of the abutment blank.

5. The holding device or the holding system according to claim 4, wherein the recess is a borehole or a blind hole.

6. The holding device or the holding system according to claim 1 or 2, characterized in that
- the basic body of the holding device has a cut-out, through which a frame having an interior surface and one accessible processing space is formed; and
- the retaining receptacle is located on the interior surface such that the abutment blank held in the retaining receptacle extends into a machining area.

7. The holding device or the holding system according to claim 1 or 2, characterized in that no forces are exerted by the holding device on the implant interface while the abutment blank is being held in the retaining receptacle.

8. The holding device or the holding system according to claim 1 or 2, characterized in that the aligning element is a groove.

9. The holding device or the holding system according to claim 8, wherein the positioning element is a web or a post.

10. The holding device or the holding system according to claim 1 or 2, characterized in that the retaining receptacle has a base area, the base area being round.

11. The holding device according to claim 1 further including an observation opening designed as a round hole or a round borehole.

12. The holding device according to claim 11, wherein the observation opening is an inspection window.

13. The holding device according to claim 11, wherein the observation opening is located in a region of a stop on the retaining receptacle to allow visual observation of satisfactory seating of the abutment blank in the retaining receptacle of the holding device.

14. The holding device of claim 1, wherein the tensioning element is a screw.

15. The holding device or the holding system according to claim 1, wherein the retaining receptacle comprises an observation opening located to allow observation of the positioning element interacting with the aligning element wherein the positioning element being a web or a post and the aligning element being a groove.

16. The holding device according to claim 1, wherein the slot in the basic body has a rectangular shape.

17. The holding device according to claim 1, wherein the axis along which the tensioning element is movable is perpendicular to the central axis of the retaining receptacle.

18. The holding device according to claim 1, wherein the retainer section adjoins the machining section and the implant interface, the machining section and the retainer section are aligned in one axis.

19. The holding device according to claim 1, wherein the tensioning element engages with the basic body tensioning the clamping jaw into the direction of the basic body such that the clamping jaw is bolted to the basic body.

20. The holding device according to claim 1, wherein a free end of the clamping jaw is tensioned by a bolt to the basic body to effect a force-fitting seat of the abutment blank in the holding device.

21. Method for holding and for machining an abutment blank by means of a holding device, comprising the following steps:
- providing a holding device according to claim 1, having at least one retaining receptacle for the abutment blank,
- providing an abutment blank, which has an implant interface on one end and has a retainer section that is spaced apart from the implant interface,
- one-sided inserting of the abutment blank with its retainer section into the corresponding retaining receptacle of the holding device, wherein the retainer section and the holding device correspond to one another in such a manner that the abutment blank is held in an aligned and rotationally secure manner in the holding device, and the implant interface is spaced apart from the holding device, securing the clamping jaw using the tensioning element to effect a secure seating of the abutment blank in the retaining receptacle of the holding device, inserting the holding device into a corresponding receptacle of a machine tool, in particular a milling machine, and fastening the holding device in the receptacle, machining a freely accessible machining section of the abutment blank to produce an abutment having a post structure, removing the retainer section of the abutment blank from the retaining receptacle of the holding device.

22. Method according to claim 21, characterized by at least one of the additional steps:
separating the modeled abutment from the retainer section of the abutment blank,
reworking of the free end of the post structure of the abutment.

23. Method according to claim 22, characterized in that separating the modeled abutment from the retainer section of the abutment blank takes place on the distal end of the post structure of the abutment.

24. Method according to claim 21, characterized by at least one of the additional steps:
loosening the holding device from the receptacle of the machine tool,
cleaning of the holding device for reuse for a further abutment blank.

25. Method according to claim 21, characterized by at least one of the additional steps:
fastening of the abutment blank in the retaining receptacle by means of a tension device,
checking of the seating of the abutment blank in the retaining receptacle by an optical inspection means in the holding device,
machining the abutment blank by milling,
starting the machining of the machining section of the abutment blank close to the implant interface, so that first an emergence profile with an adjoining post structure is modeled.

26. Method according to claim 25, characterized in that the optical inspection means in the holding device is an inspection window.

27. A holding device for holding an abutment blank, the abutment blank having an implant interface, a machining section adjoining the implant interface, a retainer section spaced apart from the implant interface and an aligning element, the holding device comprising:
a body, the body having:
a frame with an interior contact surface forming a processing space,
at least one retaining receptacle formed in the interior contact surface, the retaining receptacle having a recess for holding the abutment blank therein;
at least a portion of the interior contact surface forming a clamping jaw, the clamping jaw movable between an engaged position, in which the clamping jaw is engaged with the abutment blank when the abutment blank is disposed in the retaining receptacle, and a retracted position, in which the clamping jaw is spaced apart from the abutment blank; and
a tensioning element, the tensioning element engaging with the body and operable to move the clamping jaw between the engaged position and the retracted position by applying a tension to the clamping jaw, the tensioning element causing a reduction of a size of the retaining receptacle and causing a tension on the abutment blank itself and a force-fitting connection between the retaining receptacle and the retainer section of the abutment blank.

28. The holding device of claim 27, wherein the tensioning element comprises a threaded bolt for engaging a threaded opening on the clamping jaw.

29. The holding device of claim 28, wherein the threaded bolt is movable along a central axis that is spaced apart from a central axis of the retaining receptacle.

30. A holding device for holding an abutment blank, the abutment blank having with an implant interface, a machining section adjoining the implant interface, a retainer section spaced apart from the implant interface and an aligning element, the holding device comprising:
a basic body with a retaining receptacle for holding the abutment blank, the retaining receptacle including a positioning element, the retaining receptacle corresponding to the retainer section of the abutment blank, the positioning element of the retaining receptacle is positioned to cooperate with the aligning element of the abutment blank, the basic body further including at least one clamping jaw and a tensioning element, the clamping jaw is integrally formed with the basic body, wherein a slot in a tension region of the holding device is formed between the clamping jaw and the basic body, the tensioning element is movable along an axis that is spaced apart from and perpendicular to a central axis of the retaining receptacle, the tensioning element reduces a size of the retaining receptacle by moving the at least one clamping jaw substantially along the tensioning element axis thereby applying a force to the abutment blank positioned in the retaining receptacle effecting a force-fitting seat of the abutment blank in the holding device, wherein the abutment blank is held with the retainer section in the retaining receptacle to resist rotation, and wherein the retaining receptacle comprises a shoulder in its lower region, the shoulder forming a supporting surface for an end face of an end of the retainer section of the abutment blank, and wherein the basic body of the holding device comprises a borehole which serves as an inspection window and allows inspection of the shoulder of the retaining receptacle independently of the tension to and movement of the clamping jaw against the basic body.

* * * * *